United States Patent
Bullinger et al.

(10) Patent No.: US 7,325,641 B2
(45) Date of Patent: Feb. 5, 2008

(54) METHOD FOR ACTUATING A REVERSIBLE BELT PRETENSIONER

(75) Inventors: Wilfried Bullinger, Korntal-Muenchingen (DE); Walter Eberle, Hochdorf (DE); Markus Woldrich, Ditzingen (DE)

(73) Assignee: DaimlerChrysler AG, Stuttgart (DE)

( * ) Notice: Subject to any disclaimer, the term of this patent is extended or adjusted under 35 U.S.C. 154(b) by 392 days.

(21) Appl. No.: 10/497,686

(22) PCT Filed: Oct. 31, 2002

(86) PCT No.: PCT/EP02/12142

§ 371 (c)(1),
(2), (4) Date: Dec. 1, 2004

(87) PCT Pub. No.: WO03/047922

PCT Pub. Date: Jun. 12, 2003

(65) Prior Publication Data
US 2005/0139408 A1   Jun. 30, 2005

(30) Foreign Application Priority Data
Dec. 6, 2001   (DE) ............................... 101 60 071

(51) Int. Cl.
*B60K 28/14* (2006.01)
*B60K 28/16* (2006.01)
(52) U.S. Cl. .................. 180/268; 180/282; 280/806
(58) Field of Classification Search ............... 180/282, 180/268, 269; 280/806, 807; 297/480; 242/383.2, 242/383.4; 364/424.05
See application file for complete search history.

(56) References Cited

U.S. PATENT DOCUMENTS 5,552,986 A * 9/1996 Omura et al. .................. 701/45
5,558,370 A * 9/1996 Behr ........................... 280/806

(Continued)

FOREIGN PATENT DOCUMENTS

DE   100 01 840 A1   7/2000

(Continued)

OTHER PUBLICATIONS

International Search Report.
Japanese Office Action dated Aug. 11, 2006 (Four (4) pages).

*Primary Examiner*—Paul N. Dickson
*Assistant Examiner*—Karen J. Amores
(74) *Attorney, Agent, or Firm*—Crowell & Moring LLP

(57) ABSTRACT

Method for actuating a reversible belt pretensioner for pretensioning a belt webbing, unwound from a belt reel, of a seat belt in a motor vehicle, the belt pretensioner having a drive which acts on the belt reel, and the seat belt having, as a belt extraction lock, a locking device which acts on the belt reel in the unwinding direction and whose locking can be released only if the belt reel is rotated about a certain angle of rotation in the winding-on direction. After a triggering of the belt pretensioner caused by a hazardous situation and if a variable indicative of the belt force indicates a decrease in the belt force, an opening mode is initiated in which the belt pretensioner drive is actuated in order to open the blocking device in such a manner that, at the beginning of the opening mode, the belt reel rotates about the specific angle of rotation in the winding-on direction.

22 Claims, 1 Drawing Sheet

U.S. PATENT DOCUMENTS

| | | | |
|---|---|---|---|
| 5,593,105 A * | 1/1997 | Schmid et al. | 242/383.4 |
| 5,605,202 A * | 2/1997 | Dixon | 180/268 |
| 5,718,451 A * | 2/1998 | White | 280/735 |
| 5,765,774 A * | 6/1998 | Maekawa et al. | 242/390.9 |
| 5,788,281 A | 8/1998 | Yanagi et al. | |
| 5,931,402 A * | 8/1999 | Weller | 242/383.2 |
| 6,427,935 B1 | 8/2002 | Fujii et al. | |
| 6,499,554 B1 * | 12/2002 | Yano et al. | 180/268 |
| 6,533,321 B2 * | 3/2003 | Class et al. | 280/806 |
| 6,702,326 B1 * | 3/2004 | Fujii | 280/806 |
| 6,758,495 B2 * | 7/2004 | Brambilla et al. | 280/806 |
| 6,786,294 B2 * | 9/2004 | Specht | 180/268 |
| 7,029,032 B2 * | 4/2006 | Bullinger et al. | 280/806 |
| 7,100,945 B2 * | 9/2006 | Bullinger et al. | 280/806 |
| 7,140,478 B2 * | 11/2006 | Barvosa-Carter et al. | 188/267 |
| 7,185,919 B2 * | 3/2007 | Mather et al. | 280/808 |
| 7,195,089 B2 * | 3/2007 | Enomoto | 180/268 |
| 2001/0025735 A1 * | 10/2001 | Midorikawa et al. | 180/268 |
| 2001/0037907 A1 * | 11/2001 | Peter et al. | 180/268 |
| 2001/0054816 A1 * | 12/2001 | Brambilla et al. | 280/806 |
| 2004/0056471 A1 * | 3/2004 | Bullinger et al. | 280/806 |
| 2005/0012320 A1 * | 1/2005 | Tobata | 280/806 |
| 2005/0077412 A1 * | 4/2005 | Tanaka et al. | 242/390.9 |
| 2005/0139408 A1 * | 6/2005 | Bullinger et al. | 180/268 |
| 2006/0097504 A1 * | 5/2006 | Akaba et al. | 280/806 |

FOREIGN PATENT DOCUMENTS

| | | |
|---|---|---|
| DE | 20013541 U1 | 10/2000 |
| DE | 100 61 040 A1 | 6/2002 |
| JP | 2000-225877 A | 8/2000 |
| JP | 2001-63522 A | 3/2001 |
| JP | 2001-247005 A | 9/2001 |
| JP | 2001-247008 A | 9/2001 |
| JP | 2001-334912 A | 12/2001 |
| WO | WO 01/85494 A2 | 11/2001 |
| WO | WO 01/85495 A2 | 11/2001 |

* cited by examiner

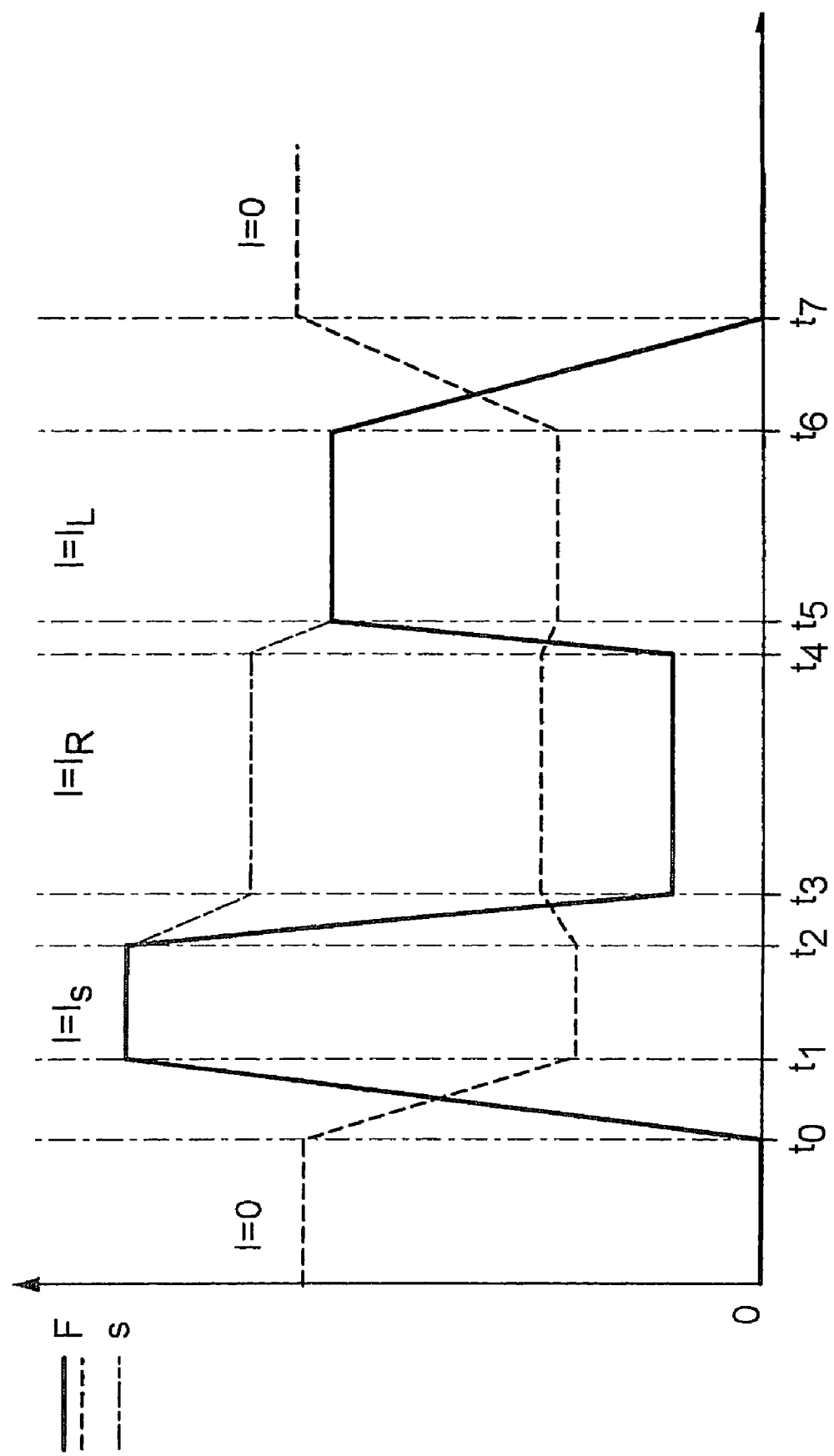

METHOD FOR ACTUATING A REVERSIBLE BELT PRETENSIONER

BACKGROUND OF THE INVENTION

The present invention relates to a method for actuating a reversible belt pretensioner.

Seat belts which are nowadays usually installed in motor vehicles have a mechanism for automatically winding the loose belt webbing onto a belt winding-on roller which is arranged on a belt reel. The automatic winding on ensures that the belt which is being worn rests loosely against the body of a vehicle occupant and is rolled up on the belt winding-on roller when the seat belt is not in use. The belt is unwound from the belt winding-on roller counter to a torque which is generated by a retraction spring, and this is also possible when the belt is being worn, in order to permit the occupant to make a largely free movement.

Furthermore, there is usually a locking device which acts as a belt extraction lock. This locking device is triggered by an actuation device with a belt-webbing-sensitive and vehicle-sensitive sensor, when the belt is being unwound quickly from the belt winding-on roller, starting from a predefined acceleration of the belt winding-on roller in the unwinding direction, or starting from a predefined acceleration of the vehicle. As a result, the belt winding-on roller is secured in the position in which it is in at this time, so that the belt webbing is prevented from unwinding. A customary locking device is composed, for example, of a locking toothing of the belt reel, and of a locking latch, which is pivotably mounted and can be pivoted into the locking toothing of the belt reel by means of the actuation device. The toothings on the belt reel and the locking latch are of self-locking design, causing the extraction of the belt to be locked for as long as tensile loading is applied to the belt. If the belt is relieved of this tensile loading, the locking mechanism can be opened, i.e. it can be returned into its inactive state. This return can be carried out magnetically, electromotively or, usually mechanically, for example by a restoring spring on the pivotably mounted locking latch.

In addition, in many seat belts there is a belt pretensioner which increases the protective effect of the seat belt. The belt pretensioner has a drive which can be actuated in order to drive a mechanical device which shortens the loose belt webbing and/or draws an occupant rearward. In the case of a pyrotechnic energy store, for example, a chemical substance is made to undergo an exothermic reaction using a firing element. In this reaction, a gas stream is generated which drives the mechanical device. The driven device is mechanically connected, or can be mechanically connected, to the belt reel, for example by a clutch. Via this connection, the mechanical device exerts a torque on the belt reel. Owing to this torque, the belt reel rotates with the belt winding-on roller arranged on it and pretensions the unwound belt webbing.

In addition to the belt pretensioners, generally pyrotechnic belt pretensioners which are used nowadays in motor vehicles, use can also be made in vehicles of reversible belt pretensioners which can be triggered repeatedly, even in rapid succession. These reversible belt pretensioners can have different drives; for example, a belt pretensioner of this type can be driven by an electric motor which acts permanently or in a controllable manner via a clutch on the belt reel. Other reversible belt pretensioners are driven with compressed air from a pressure accumulator, or by a stressed spring, with it being possible to refill the pressure accumulator during the travel mode and to restress the spring during the travel mode.

Reversible belt pretensioners which are driven in this manner permit the seat belt to be pretensioned to a predefinable degree, at a predefinable speed and for a predefinable period of time. The multiple triggering capability of the reversible belt pretensioner permits it to be triggered preventively. Preventive triggering allows the belt pretensioner to be triggered in safety-critical travel situations which are detected, for example, be vehicle-movement dynamics sensors or vehicle-surroundings sensors or which are determined by the evaluation of the actuation of the brake pedal, of the steering angle or of a driver observation.

In addition to preventive triggering, a reversible belt pretensioner can also be used for tactly warning the driver in safety-critical situations. When there is preventive triggering of the belt pretensioner, which may take place before the detection of a collision, or when the belt pretensioner is triggered for warning purposes, it is desirable that, after pretensioning has taken place, after the end of the hazardous situation and with the normal travel mode safeguarded, the belt rests loosely against the occupant again. A normal travel mode is safeguarded if the evaluation of the situation by a control unit or a hazard computer does not reveal that there is a safety-critical situation or if the condition necessary for triggering the belt pretensioner is no longer satisfied. Such a condition may be the presence or the absence of a certain signal on a data bur or a data line.

After reversible pretensioning of the seat belt with a reversible belt pretensioner, it is possible that the belt extraction lock has become active owing to a belt-webbing-sensitive sensor or a vehicle-sensitive sensor which actuate the locking device electrically or mechanically. Examples of belt-webbing-sensitive sensors are a mechanical centrifugal-force sensor in the belt winding-on mechanism, an electromechanical centrifugal-force sensor or an electronic belt extraction sensor which senses the extraction speed of the belt webbing or its acceleration.

A belt-webbing-sensitive sensor can respond, in particular, if, after belt pretensioning, the pretensioned belt, which is under a tensile loading, is released. This tensile loading of the pretensioned belt is, in particular, dependent on the strength of the pretensioning process which has previously occurred and on the sitting position of the occupant before the pretensioning process. As a result of the tensile loading, after a pretensioning process the belt is unwound again from the belt winding-on roller after the torque exerted on the belt reel by the belt pretensioner drive decreases. If the unwinding of the belt webbing takes place too quickly, the belt-webbing-sensitive sensor responds and the locking device is actuated, generally mechanically, so that it closes. This means that the belt extraction lock becomes active.

The belt extraction lock can also become active already if the belt-webbing-sensitive sensor responds owing to the winding-on process during the pretensioning of the belt, or the vehicle-sensitive sensor responds owing to the movement of the vehicle. If the belt extraction lock is active, it is no longer possible to unwind the pretensioned belt and the freedom of movement of the occupants is greatly restricted. The belt webbing is therefore to be released again if the cause of the triggering of the belt pretensioner no longer applies and/or if a normal travel mode is safeguarded. In order to release the belt webbing again, in the case of the locking devices which are customary nowadays in motor vehicles, the locking latch is to be released from the locking toothing. The release of the belt webbing is only possible if the vehicle-sensitive and the belt-webbing-sensitive sensor do not actuate the locking device in order to lock the same.

SUMMARY OF THE INVENTION

An object of the present invention is to improve the comfort during the use of a reversible belt pretensioner. This object has been achieved according to the present invention by a method for actuating a belt pretensioner in which, after a belt-pretensioning operation which has taken place to protect an occupant due to a hazardous situation, the belt pretensioner is actuated in order to open the locking device in an opening mode. At least one variable indicative of the belt force is detected by a belt-pretensioner control unit, and is used for the actuation in the opening mode such that the opening mode is initiated only if a variable which is indicative of the belt force indicates a predefinable decrease in the belt force.

The actuation of the belt pretensioner takes place in such a manner that, firstly in a winding-on phase, the belt reel is rotated about a certain angle of rotation in the winding-on direction, because the opening of the locking device can take place only if the belt webbing no longer exerts any force on the locking mechanism and, for example in the case of a locking device having an undercut locking toothing, a rotation of the belt reel at least around the undercut of the teeth takes place, in which case the belt webbing is slightly wound on.

In an alternative embodiment of the method according to the invention, the opening mode can also be initiated if the variable indicative of the belt force indicates the fact that the belt force falls short of a predefinable threshold value.

The belt force is to be understood as being that force which is exerted by the belt webbing on an occupant. The belt force is therefore a variable which can be directly perceived by the occupant and which acts perpendicularly to the run of the belt webbing. If the belt force increases, then the tensile force in the belt webbing also increases, and vice versa. Apart from the time at which the opening mode is initiated, the degree and the speed of the winding-on operation at the beginning of the opening mode may also depend on the belt force or on a variable indicative of it.

An advantage of the method according to the invention, in which the belt force which occurs and/or the belt-force profile or variables indicative of them are used in order to determine the time at which the actuation of the belt pretensioner drive into the opening mode begins is that an impairment of the comfort of the driver or of another occupant is avoided or is at least reduced. Such an impairment in the comfort would be caused by a noticeable increase in the belt force during the process of releasing the locking device following a hazardous situation which is already over.

In one further development of the inventive method, the opening mode is initiated only if it is concluded, by a sensed variable, that a predefinable condition is present which is indicative of an end of the hazardous situation.

In order to have as little adverse effect on the occupant as possible, the belt-pretensioner device motor is controlled by actuation of the belt pretensioner preferably so that the variable indicative of the belt force, which increases by way of a winding-on operation, remains in a predefinable value region until the belt reel has rotated to an extent sufficient for the locking device to be open. As a result, the winding-on of the belt webbing during the rotation of the belt reel in the winding-on direction takes place in a manner such that it is virtually unnoticeable by the occupant.

For example, during a rearward shifting of the occupant in the direction of the backrest of the seat, which shifting takes place following a severe braking and by means of which the belt forces acting on the occupant are reduced, the belt pretensioner is actuated such that, during the rearwards shifting of an occupant, the belt webbing is wound onto the belt roller until the belt reel has reached a position in which the locking device can open. In this case, the motor current of the belt-pretensioner drive is controlled so that the belt force with which the belt webbing acts on the occupant remains as constant as possible until the belt reel reaches an end position in which, at least owing to the toothing of the locking device, the opening of the same is possible. The opening of the locking device can be carried out only if the belt webbing no longer exerts any force on the locking mechanism and, for example in the case of a locking device with an undercut locking toothing, a rotation of the belt reel at least about the undercut of the teeth takes place.

As an alternative to a force profile which is as constant as possible during the winding-on phase in the opening mode, the motor current is controlled so that the force which the belt exerts on the occupant is slowly reduced until the end position of the belt reel is reached. In the two abovementioned alternative examples, the belt force is preferably no longer substantially increased in the opening mode, so as to impart to the occupant a comfortable sensation.

The belt reel is preferably rotated by the belt-pretensioner drive only precisely to the extent sufficient in order, for the first time, to reach a position in which the locking device can open. This position is determined by the angle of rotation of the belt reel being detected, for example, by an angle-of-rotation sensor, or being determined by evaluation of the motor current. The rise in force in the belt, which is brought about by the actuation in order to open the locking device, is kept as small as possible by the belt reel rotating as little as possible.

In one refinement of the method, in a vehicle with a brake booster system, the presence of a brake booster signal is detected. The signal is output by a brake booster system and causes a braking action with a predefined strong braking effect. The omission of this brake booster signal is, firstly, indicative of the end of the hazardous situation and, secondly, as the variable indicative of the belt force initiates the opening mode. The advantage of this refinement is that it is only necessary to detect the presence of a signal, which is correlated with a belt force, and already thereby the opening mode is initiated in a simple manner such that in frequent situations an impairment in the comfort is avoided or reduced.

If the vehicle is equipped with a brake booster system which not only produces a binary brake booster signal (on/off), but also a plurality of graduations or a proportional signal, then the strength of the braking action, which is related to the brake booster signal, and the measure which is associated with the brake booster signal can be used as a variable indicative of the belt force.

From the bake booster signal, or from its omission, a conclusion can be drawn about the profile of the acceleration of a free body in the vehicle interior and about the profile of the acceleration of an occupant in the vehicle interior. A conclusion can in turn be drawn about the belt force by the acceleration of an occupant. This can be further improved, if, in addition, further data, such as, for example, the vehicle speed or the coefficient of friction between tires and load are used. It is also possible, as an alternative to a brake booster signal, for these data to be used as variables indicative of the belt force or in order to determine a variable of this type.

This gives rise to further advantageous refinements of the method according to the invention.

For example, in a braking operation, the fact that the vehicle speed reaches or falls short of a first speed threshold value is used as an indication of the end of the hazardous situation, the fact that the traveling speed, as a variable indicative of the belt force, reaches or falls short of a second speed threshold value indicating the decrease in the belt force. The first and also the second traveling speed threshold values can be identical, in particular can both be zero.

In a further development of the method, the variable indicative of the belt force is a belt-force expected variable which is determined by a belt-force model. A conclusion is then drawn about a decrease in the belt force if the belt-force expected variable decreases by at least a predefinable decrease threshold value. The belt-force expected variable is a measure of the belt force to be expected at a particular instance, but it may deviate from the actual belt force, since only some of the causal parameters of the actual belt force are used in order to determine the belt-force expected variable. In this case, a more important factor than the quantitative determination of the belt force is to depict the qualitative profile of the belt force by the belt-force expected variable determined by the belt-force model. In order to determine the belt-force expected variable, it is contemplated, for example, for just the longitudinal acceleration of the vehicle to be used as the only model parameter. However, it is advantageous to take on additional parameters, for example the transverse acceleration of the vehicle or the occupant mass, which is detected by an occupant recognition device, an estimation method, a weight-detecting mat or other weight sensors.

In one refinement of this development, at least the vehicle speed, and in addition, a brake-system variable indicating a braking action and/or a signal of a brake booster system are used as model parameters for the belt-force model.

In still another refinement of the development, a signal of a vehicle-movement-dynamics control system and/or the yaw rate and/or the steering angle are used as model parameters.

In one refinement of the method according to the invention, in order to determine the variable indicative of the belt force, one or more force- or strain-measuring devices are arranged in or on the belt webbing or another part of the belt system. In a first approximation, the belt force can be considered as being proportional to the tensile force in the belt, and so a tensile force detected in the belt or on a belt-suspension means is particularly suitable as a variable indicative of the belt force.

In another refinement of the method according to the invention, the motor current during a predefinable actuation phase of the belt-pretensioner drive is used as the variable indicative of the belt force.

In another refinement, the predefinable actuation phase is a motor-current test phase and, in this motor-current test phase, a predefinable single or repeated actuation the belt-pretensioner drive in order to determine the motor current is carried out so that the belt reel rotates only to an extent such that the locking device can not yet be released. Using the motor current as the variable indicative of the belt force has the advantage that an additional measuring device is not required and nevertheless a variable correlated directly with the belt force is taken into consideration.

In a first approximation, the motor current is proportional to the force of the belt-pretensioner motor which, when leaving aside losses due to friction, is equal to the tensile force in the belt webbing if the belt webbing his not held by the locking device or another device. A more precise association between the motor current and belt force can take place via a characteristic curve which also takes account of the frictional forces on the belt-deflecting device and other components.

BRIEF DESCRIPTION OF THE DRAWINGS

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. The sole FIGURE is a plot showing, the profiles of the belt-pretensioner drive force F (solid lines/dashed lines) and of the belt travel s (chain-dotted lines) over the time t when the method according to the invention is being carried out. The profiles are merely illustrated qualitatively and the ratios of the individual time intervals between two times $t_n$ and $t_{n+1}$ in each case can differ greatly from the time ratios during an actual method sequence.

DETAILED DESCRIPTION OF THE DRAWINGS

In the FIGURE, the time to indicates the beginning and the time $t_7$ indicates the end of the method for actuating a reversible belt pretensioner.

The reversible belt pretensioner used for the description of the FIGURES is, by way of example, an electromotively driven belt pretensioner. However, a pneumatically or hydraulically driven belt pretensioner may also be used. In the case of an electromotive belt pretensioner, a variable which can be controlled directly is the motor current which flows through the drive motor. This is closely linked with the belt-pretensioner drive force F which the belt-pretensioner drive exerts on the belt. An increase in the motor current generally also brings about an increase in the belt-pretensioner drive force F. Reference is therefore repeatedly made below, for example for a controlled variable of a belt-pretensioner drive, to the motor current I.

The actual belt pretensioning, which is preferably triggered in order to protect an occupant and constitutes the start of the entire belt-pretensioning process, begins at the time $t_0$. Up to this time $t_0$, the vehicle is in a normal operating state and the belt pretensioner is accordingly in the basic state, i.e. it is inactive. The same applies to the motor current which in the basic state flows through the belt-pretensioner drive motor at I=0. At the time to, for example, a control signal of a brake booster system is now detected, and this causes the reversible belt pretensioner to be triggered in order to protect an occupant. The belt-pretensioner drive motor pretensions the belt with a predefinable, high pretensioning strength, i.e. the motor current is $I=I_S$, in which case, depending on the design of the belt pretensioner, the motor current and the belt-pretensioner drive force can be adapted to a hazardous situation and/or to detected occupant parameters. The belt force increases up to a pretensioning value and the belt length unwound from the belt reel drops to a minimum value.

The end of the actual belt pretensioning, which serves to protect the occupant, is defined by a predefinable time interval $t_2 - t_0$ and, in addition or alternatively, is linked to a predefinable condition, for example a threshold value for the vehicle acceleration or the belt force. In this pretensioning interval, the motor current increases up to the time $t_1$ in order to remain at the predefinable pretensioning value $I_s$ for a short period $t_2-t_1$. The period $t_2-t_1$ may also be 0 s, which means that the phase of increase of the motor current is immediately followed by the phase between the times $t_2$ and $t_3$, in which the motor current is reduced to a retaining level of $I=I_R$. This retaining level of the motor current can be relatively high, but is usually less than $I_S$ (dashed-line profile between $t_3$ and $t_4$, in which case a belt extraction is largely prevented by the holding force of the drive motor of the belt pretensioner. The retaining level of the motor current will be relatively low (solid-line profile between $t_3$ and $t_4$) or will be equal to zero. The entire retaining force, or part of the retaining force, is then produced by the frictional forces which occur, for example, on the belt-deflecting roller. In addition, the motor current can be reduced, for example, at a vehicle acceleration of above 5 m/s², down to $I=I_R=0$. In this case ($I_R=0$), an undesirable belt extension between the times $t_3$ and $t_4$ is virtually completely prevented by the locking device, with the exception of a slight unwinding of the belt webbing until the belt reel reaches a position in which the locking device grips and prevents further extraction of the belt.

The end of a hazardous situation and/or a normal operating state of the vehicle is ascertained by parameters, such as the vehicle speed, the actuation of the brake pedal or actuation of the steering wheel. This is the case, for example, if, after full braking, the brake pedal is released or the vehicle comes to a standstill.

After a normal operating state of the vehicle is ascertained between the times $t_3$ and $t_4$ and, if appropriate, further predefined conditions are fulfilled, a variable indicative of the belt force is used in order to initiate the opening mode. For example, at the time $t_4$ the longitudinal acceleration of the vehicle has decreased by a predefinable value and therefore, as the variable indicative of the belt force, indicates the fact that the belt force has decreased by at least a predefinable value. Another variable which is indicative of the belt force and with which the time $t_4$ can advantageously be determined is a signal for the braking activity or a signal for the braking strength, since the belt force is in part greatly reduced by the occupants swinging back in the direction of the seat back following a braking operation.

At the time $t_4$, the drive of the belt pretensioner is actuated in the opening mode, in which case the motor current is controlled in the opening mode so that, between the times $t_4$ and $t_5$, the belt reel is rotated in the winding-on direction to an extent until its position permits the locking device to be opened, with the belt webbing being wound on for a small distance during this rotation. For this purpose, in a conventional locking device composed of a lock latch and a complementary toothing on the belt reel the undercut teeth of the lock latch and toothing must no longer overlap. In the case of a locking device of this type, the minimum angle of rotation is given by the angle of the undercut. At the time $t_5$, the belt reel has rotated about the required angle of rotation, which can be detected by an angle-of-rotation sensor or can be determined by an evaluation of the motor current. The winding-on operation preferably takes place so that the belt force does not increase, or at least only increases very slightly, during the winding-on of the belt webbing in the opening mode. In order to make such an actuation possible, use is made of the variable indicative of the belt force and the motor current of the belt-pretensioner motor. In a simple alternative variant, the belt webbing is wound on with a predefinable, moderate motor current without the belt force having to be further taken into consideration in the winding-on operation.

After the time $t_5$, the motor current of the drive motor of the belt pretensioner for a predefinable release time $T_L=t_6-t_5$ is set to a release current strength $I=I_L$ and is again set back into the basic state $I=0$. The release time $T_L$ may also be equal to zero.

At the time $t_6$, it is ensured that all of the conditions for opening the locking device are fulfilled, the motor current is dropped between the time $t_6$ and $t_7$ to $I=0$ and the belt webbing is released for unwinding in this unwinding phase. At the time $t_7$, the reversible belt pretensioner is again in the basic state.

The effect achieved by actuating the belt pretensioner at the time $t_4$ is that the belt force acting on the occupant when winding on the belt webbing during the release operation only assumes a relatively low value and/or does not substantially increase in order to open the locking device by rotation of the belt reel.

The invention claimed is:

1. A method for actuating a reversible belt pretensioner for pretensioning a belt webbing, unwound from a belt reel, of a seat belt in a motor vehicle, wherein the belt pretensioner has a drive configured to act on the belt reel, and the seat belt has a belt extraction locking device which acts on the belt reel in the unwinding direction and whose locking can be released only if the belt reel is rotated about an angle of rotation in the winding-on direction, comprising initiating, after a triggering of the belt pretensioner caused by a hazardous situation and sensing when a variable indicative of the belt force indicates a decrease in the belt force, an opening mode in which the belt pretensioner drive is actuated to open the locking device so that, at a beginning of the opening mode, the belt reel rotates through the angle of rotation in the winding-on direction.

2. The method as claimed in claim 1, wherein the opening mode is initiated only if a predefined vehicle operating state is present which is indicative of an end of the hazardous situation.

3. The method as claimed in claim 2, wherein in a braking operation, the vehicle speed reaching or falling short of a first speed threshold value is indicative of the end of the hazardous situation, and the traveling speed, as a variable indicative of the belt force, reaching or falling short of a second speed threshold value is indicative of the decrease in the belt force.

4. The method as claimed in claim 3, wherein the first and second traveling speed threshold values are zero.

5. The method as claimed in claim 2, wherein the indicative variable of the belt force is a belt-force expected variable which is determined by a belt-force model using vehicle-movement-dynamics parameters, and a decrease in the belt force is concluded if the belt-force expected variable decreases by at least one predefinable decrease threshold value.

6. The method as claimed in claim 5, wherein at least the vehicle speed and at least one of a brake-system variable indicating a braking action and a signal of a brake booster system are utilized as model parameters for the belt-force model.

7. The method as claimed in claim 5, wherein a signal of at least one of a vehicle-movement-dynamics control system, yaw rate and steering angle are utilized as model parameters.

8. The method as claimed in claim 1, wherein a vehicle with a brake booster system in which a brake booster system signal brings about a triggering of a braking action with a predefined, strong braking effect, an omission of the brake assistance signal is indicative both of the end of the hazardous situation and also of the decrease in the belt force or the fact that the belt force falls short of a threshold value, and initiates the opening mode.

9. The method as claimed in claim 1, wherein motor current during a predefinable actuation phase of the belt pretensioner drive is utilized as a variable indicative of the belt force.

10. The method as claimed in claim 9, wherein the predefinable actuation phase is a motor-current test phase during which a predefinable single or multiple actuation of the belt pretensioner drive in order to determine the motor current is carried out so that the belt reel rotates only to an extent such that the locking device can not yet be released.

11. The method as claimed in claims 1, wherein, in order to determine the variable indicative of the belt force, at least one force- or strain-measuring devices are operatively arranged in or on the belt webbing or another part of the belt system.

12. A method for actuating a reversible belt pretensioner for pretensioning a belt webbing, unwound from a belt reel, of a seat belt in a motor vehicle, wherein the belt pretensioner has a drive configured to act on the belt reel, and the seat belt has a belt extraction a locking device which acts on the belt reel in the unwinding direction and whose locking can be released only if the belt reel is rotated about an angle of rotation in the winding-on direction,
comprising initiating, after a triggering of the belt pretensioner caused by a hazardous situation and sensing when a variable indicative of the belt force indicates the fact that the belt force falls short of a predefinable threshold, initiating an opening mode in which the belt pretensioner drive is actuated to open the locking device so that, at a beginning of the opening mode, the belt reel rotates through the angle of rotation in the winding-on direction.

13. The method as claimed in claim 12, wherein the opening mode is initiated only if a predefined vehicle operating state is present which is indicative of an end of the hazardous situation.

14. The method as claimed in claim 13, wherein in a braking operation, the vehicle speed reaching or falls short of a first speed threshold value is indicative of the end of the hazardous situation, and the traveling speed, as a variable indicative of the belt force, reaching or falling short of a second speed threshold value is indicative of the decrease in the belt force.

15. The method as claimed in claim 14, wherein the first and second traveling speed threshold values are zero.

16. The method as claimed in claim 13, wherein the indicative variable of the belt force is a belt-force expected variable which is determined by a belt-force model using vehicle-movement-dynamics parameters, and a decrease in the belt force is concluded if the belt-force expected variable decreases by at least one predefinable decrease threshold value.

17. The method as claimed in claim 16, wherein a signal of at least one of a vehicle-movement-dynamics control system yaw rate and steering angle are utilized as model parameters.

18. The method as claimed in claim 13, wherein at least the vehicle speed and at least one of a brake-system variable indicating a braking action and a signal of a brake booster system are utilized as model parameters for the belt-force model.

19. The method as claimed in claim 12, wherein a vehicle with a brake booster system in which a brake booster system signal brings about a triggering of a braking action with a predefined, strong braking effect, an omission of the brake assistance signal is indicative both of the end of the hazardous situation and also of the decrease in the belt force or the fact that the belt force falls short of a threshold value, and initiates the opening mode.

20. The method as claimed in claim 12, wherein motor current during a predefinable actuation phase of the belt pretensioner drive is utilized as a variable indicative of the belt force.

21. The method as claimed in claim 20, wherein the predefinable actuation phase is a motor-current test phase during which a predefinable single or multiple actuation of the belt pretensioner drive in order to determine the motor current is carried out so that the belt reel rotates only to an extent such that the locking device can not yet be released.

22. The method as claimed in claim 12, wherein, in order to determine the variable indicative of the belt force, at least one force- or strain-measuring devices are operatively arranged in or on the belt webbing or another part of the belt system.

* * * * *